United States Patent
Setlak (10) Patent No.: US 9,652,066 B2
(45) Date of Patent: May 16, 2017

(54) ELECTRONIC DEVICE INCLUDING FINGER BIOMETRIC SENSOR INCLUDING TRANSPARENT CONDUCTIVE BLOCKING AREAS CARRIED BY A TOUCH DISPLAY AND RELATED METHODS

(71) Applicant: Apple Inc., Cupertino, CA (US)

(72) Inventor: Dale R. Setlak, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 70 days.

(21) Appl. No.: 14/606,502

(22) Filed: Jan. 27, 2015

(65) Prior Publication Data

US 2016/0216813 A1 Jul. 28, 2016

(51) Int. Cl.
*G06F 3/041* (2006.01)
*G06K 9/00* (2006.01)

(52) U.S. Cl.
CPC ......... *G06F 3/0412* (2013.01); *G06K 9/0002* (2013.01)

(58) Field of Classification Search
CPC .................. G06F 3/0412; G06K 9/00033
See application file for complete search history.

(56) References Cited

U.S. PATENT DOCUMENTS

| | | |
|---|---|---|
| 2011/0102567 A1 | 5/2011 | Erhart |
| 2011/0102569 A1 | 5/2011 | Erhart |
| 2012/0182253 A1 | 7/2012 | Brosnan |
| 2013/0057503 A1* | 3/2013 | Hristov ............... G06F 3/044 345/174 |
| 2013/0181949 A1* | 7/2013 | Setlak ............... G06K 9/0002 345/175 |
| 2013/0201134 A1 | 8/2013 | Schneider et al. |
| 2015/0042600 A1* | 2/2015 | Lukanc ............... G06F 3/0412 345/174 |

* cited by examiner

*Primary Examiner* — Ariel Balaoing
(74) *Attorney, Agent, or Firm* — Allen, Dyer, Doppelt, Milbrath & Gilchrist, P.A.

(57) ABSTRACT

An electronic device may include a touch display including at least one display layer, and at least one transparent conductive layer thereon defining touch sensing pixels. The electronic device may also include a finger biometric sensor carried by the touch display and that includes a finger biometric sensing layer including an array of transparent conductive finger biometric sensing pixels capacitively coupled to the at least one transparent conductive layer of the touch display. The finger biometric sensor may also include switchable transparent conductive blocking areas between the finger biometric sensing layer and the at least one transparent conductive layer of the touch display and may be selectively switchable between blocking and reading states.

22 Claims, 6 Drawing Sheets

ELECTRONIC DEVICE INCLUDING FINGER BIOMETRIC SENSOR INCLUDING TRANSPARENT CONDUCTIVE BLOCKING AREAS CARRIED BY A TOUCH DISPLAY AND RELATED METHODS

TECHNICAL FIELD

The present invention relates to the field of electronics, and, more particularly, to the field of finger sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication.

SUMMARY

An electronic device may include a touch display that includes at least one display layer, and at least one transparent conductive layer thereon defining touch sensing pixels. The electronic device may also include a finger biometric sensor carried by the touch display and that includes a finger biometric sensing layer that includes an array of transparent conductive finger biometric sensing pixels capacitively coupled to the at least one transparent conductive layer of the touch display. The finger biometric sensor may also include a plurality of switchable transparent conductive blocking areas between the finger biometric sensing layer and the at least one transparent conductive layer of the touch display and that are selectively switchable between blocking and reading states. Accordingly, a finger biometric may be sensed during operation of the touch display.

The electronic device may further include reading circuitry coupled to the finger biometric sensor. The reading circuitry may include at least one amplifier coupled to the array of transparent conductive finger biometric sensing pixels, and a plurality of switches. Each switch is associated with a respective one of the switchable transparent conductive blocking areas.

The reading circuitry may also include a controller coupled to the at least one amplifier and the plurality of switches. The controller may be configured to read consecutive rows of the array of transparent conductive finger biometric sensing pixels, and switch the switchable transparent conductive blocking areas beneath a row being read to the reading state while switching other switchable transparent conductive blocking areas to the blocking state, for example. The controller may also be configured for two-dimensional differential reading of the array of transparent conductive finger biometric sensing pixels, for example.

The blocking state may include being coupled to a reference voltage. The reading state may include being electrically floating, for example.

The switchable transparent conductive blocking areas may include a plurality of spaced apart rectangular patches extending in a first direction of the array transparent conductive finger biometric sensing pixels. The finger biometric sensor may extend over an entire upper surface of the touch display, for example.

The electronic device may also include a lower transparent dielectric layer between the touch display and the finger biometric sensor. The electronic device may further include a transparent dielectric cover layer over the finger biometric sensor, for example.

A method aspect is directed to a method of sensing a finger biometric using an electronic device that includes a touch display. The touch display includes at least one display layer and at least one transparent conductive layer thereon defining touch sensing pixels. The electronic device may include a finger biometric sensor carried by the touch display. The method may include selectively switching a plurality of switchable transparent conductive blocking areas of the finger biometric sensor between blocking and reading states. The plurality of switchable transparent conductive blocking areas are between a finger biometric sensing layer of the finger biometric sensor and the at least one transparent conductive layer of the touch display. The finger biometric sensing layer includes an array of transparent conductive finger biometric sensing pixels capacitively coupled to the at least one transparent conductive layer of the touch display.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
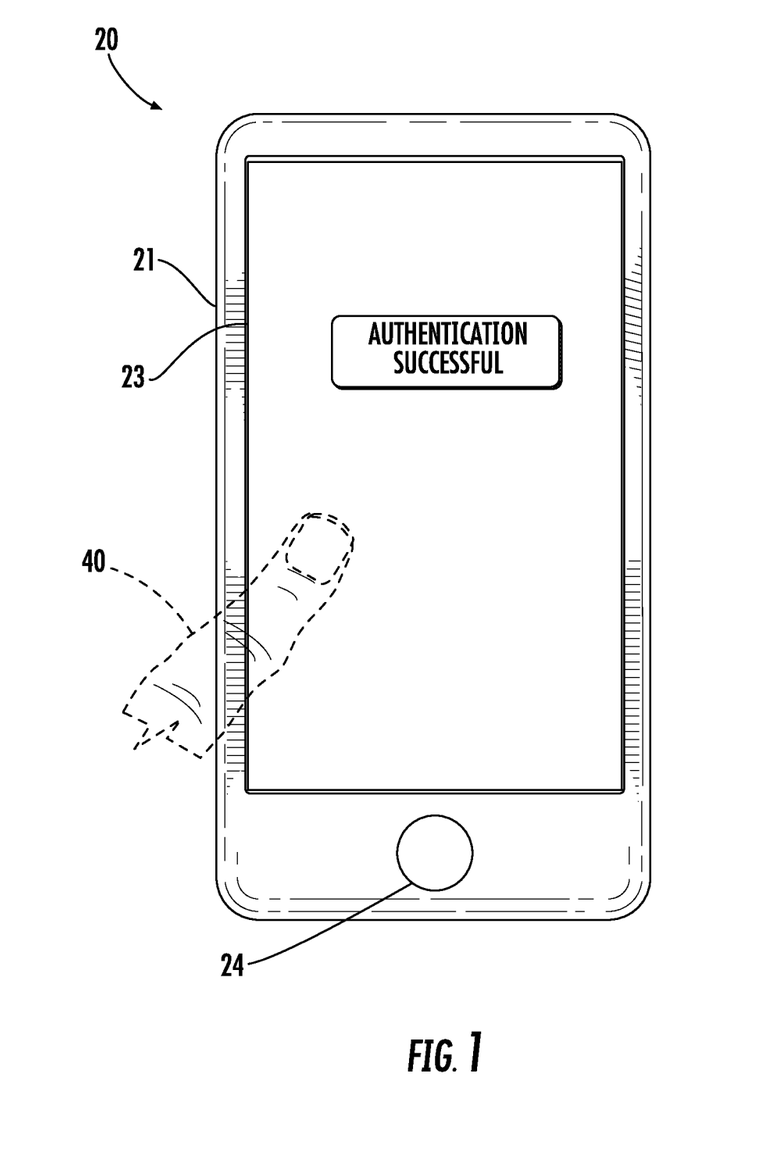
FIG. 1 is a plan view of an electronic device according to an embodiment.
Figure 2:
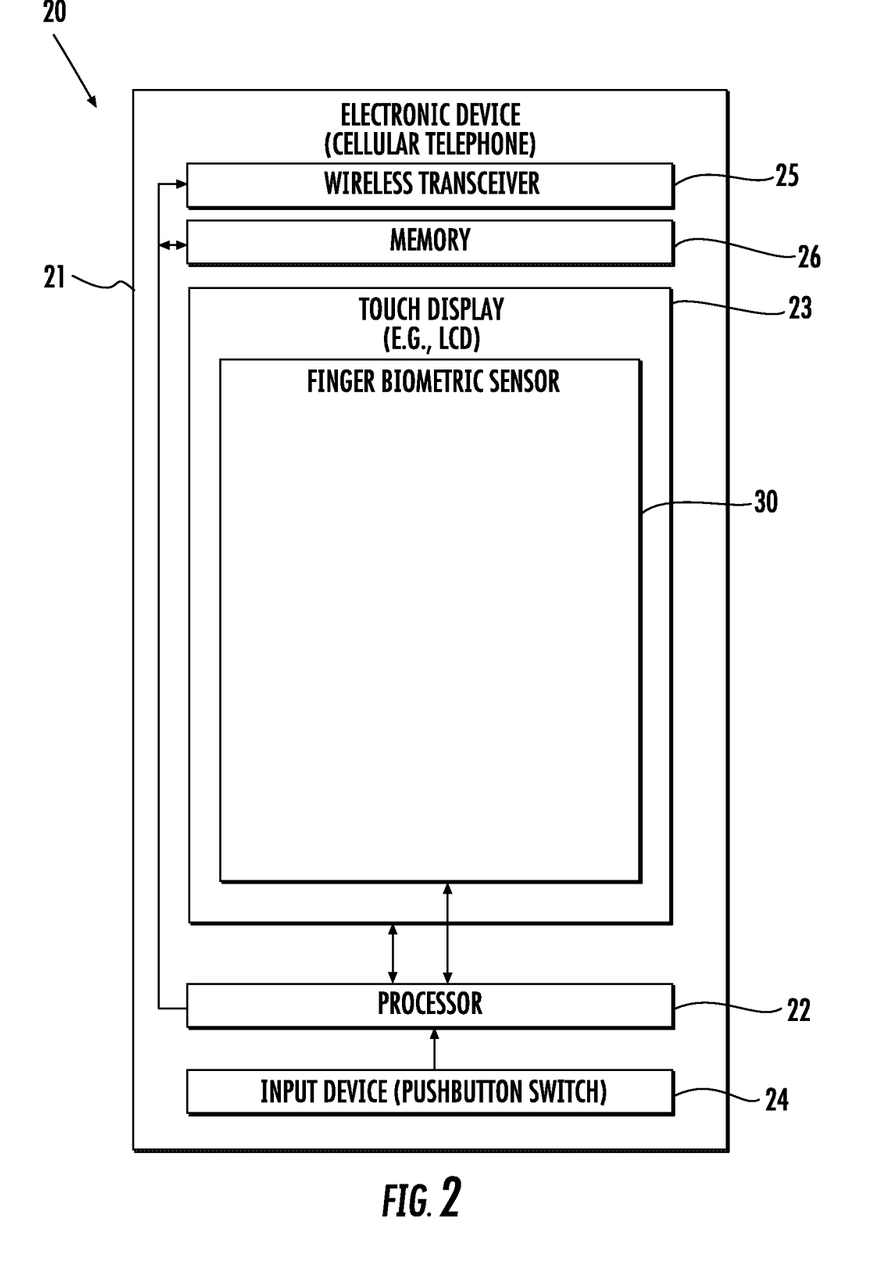
FIG. 2 is a schematic block diagram of the electronic device of FIG. 1.

Referring initially to FIGS. 1 and 2, an electronic device 20 is now described. The electronic device 20 illustratively includes a housing, for example, a portable housing 21, and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A touch display 23 is also carried by the portable housing 21 and is coupled to the processor 22. The touch display 23 may be a liquid crystal display (LCD), for example, or may be another type of touch display, as will be appreciated by those skilled in the art. Further details of the touch display 23 are described below.

A memory 26 is also coupled to the processor 22. The memory 26 is for storing finger matching biometric template data, for example. The memory 26 may store other or additional types of data, as will be appreciated by those skilled in the art.

As will be appreciated by those skilled in the art, the touch display 23 acts as both an input device and a display. As such, the touch display 23 cooperates with the processor 22 to perform one or more device functions in response to input. For example, a device function may include a powering on or off of the electronic device 20, initiating communication via the wireless transceiver 25, and/or performing a menu function based upon input to the touch display 23.

More particularly, with respect to a menu function, the processor 22 may change the touch display 23 to show a menu of available applications based upon pressing or input to the touch display. Of course, other device functions may be performed based upon input to the touch display 23. Other or additional finger-operated user input devices may be carried by the portable housing 21, for example, a pushbutton switch 24, which may be used for other and/or additional device functions as will be appreciated by those skilled in the art.

Figure 3:
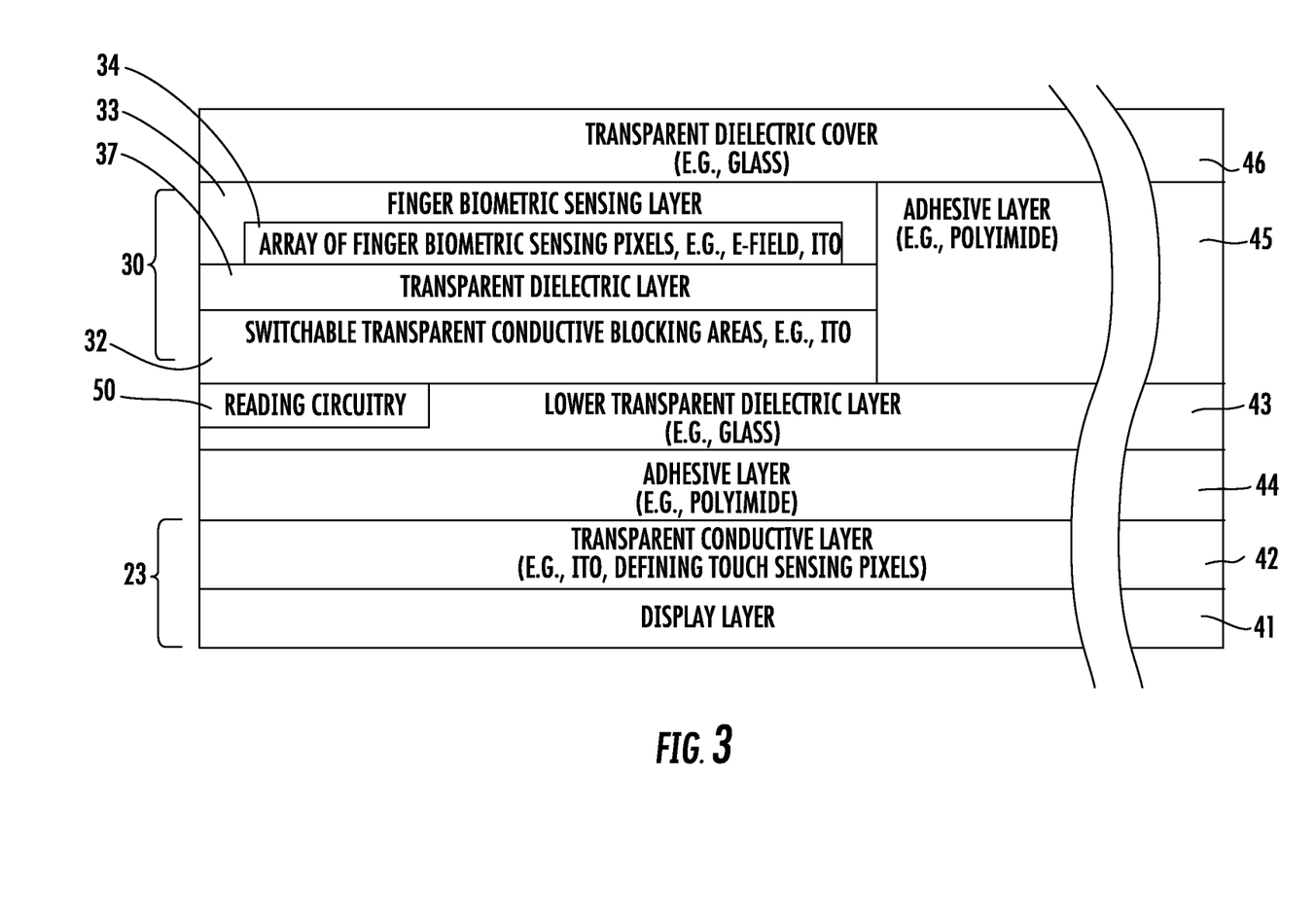
FIG. 3 is a more detailed schematic diagram of the electronic device of FIG. 1.

Referring now additionally to FIG. 3, the touch display 23 includes a display layer 41, and a transparent conductive layer 42 thereon defining touch sensing pixels, as will be appreciated by those skilled in the art. The transparent conductive layer 42 may comprise indium-tin-oxide (ITO), for example. The transparent conductive layer 42 is illustratively carried by or coupled to an upper surface of the display layer 41. However, in some embodiments, the transparent conductive layer 42 may be coupled to a lower surface of the display layer 41. Also, in some embodiments, there may be more than one transparent conductive layer 42 carried by a respective surface of the display layer 41 or within one or more display layers, as will be appreciated by those skilled in the art. Of course, there may be more than one display layer and more than one transparent conductive layer independent of one another.

A lower transparent dielectric layer 43 is carried by the touch display 23. The lower transparent dielectric layer 43 may be glass, for example. The lower transparent dielectric layer 43 is illustratively coupled to the touch display 23 by an adhesive layer 44, for example, a polyimide layer. Other and/or additional types of adhesives may be used. In some embodiments, the lower transparent dielectric layer 43 and the adhesive layer 44 may be absent.

A finger biometric sensor 30 is carried by the touch display 23. More particularly, the finger biometric sensor 30 is carried by the lower transparent dielectric layer 43 and extends partially over an upper surface of the transparent dielectric layer. Another adhesive layer 45 may be adjacent the finger biometric sensor 30 across the upper surface the touch display 23, or more particularly, the transparent dielectric layer 43.

The finger biometric sensor 30, in cooperation with the touch display 23, senses a user's finger 40 or an object placed adjacent the finger biometric sensor. When a user contacts the touch display 23, for example, during a navigation function or other touch display input, data from the user's finger 40 is acquired, for example, for finger matching and/or spoof detection, as will be appreciated by those skilled in the art.

Figure 4:
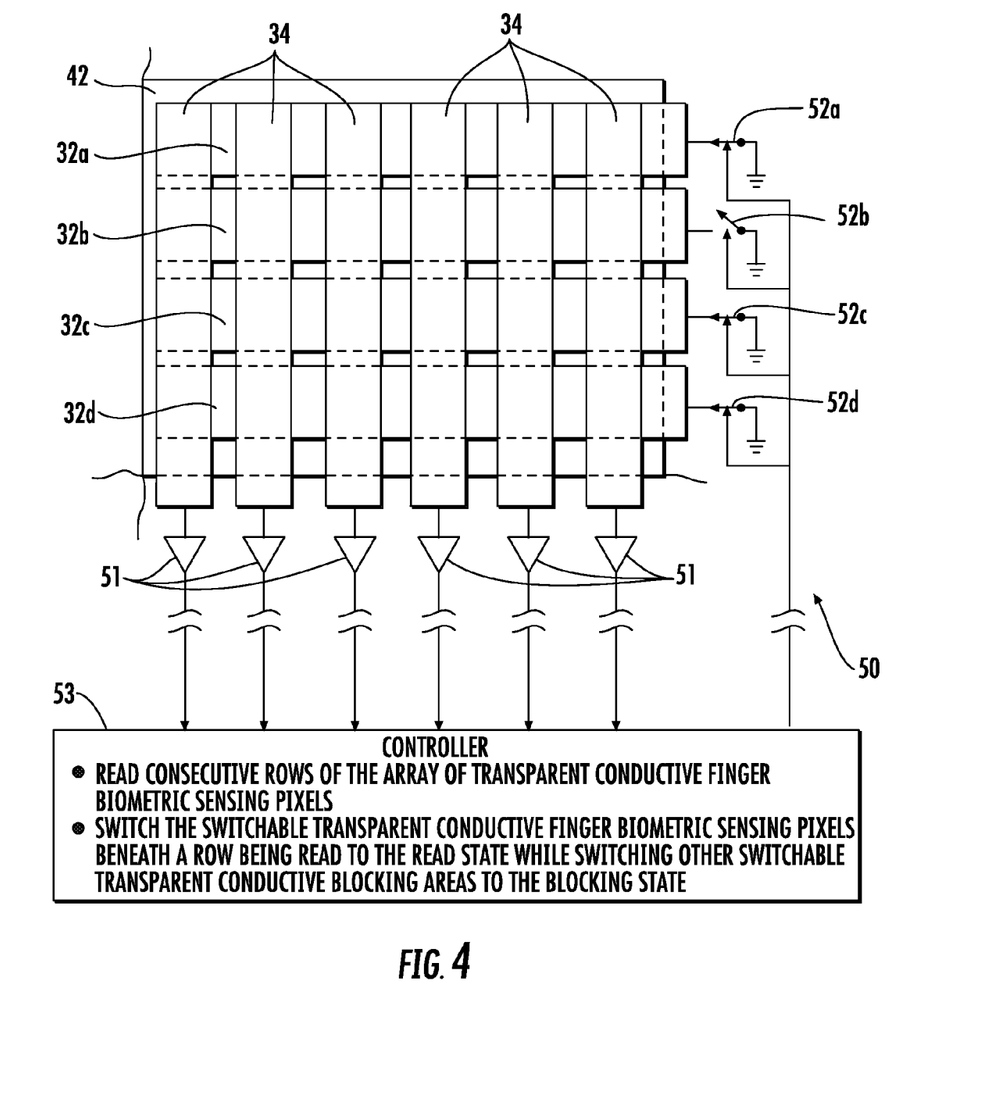
FIG. 4 is a schematic top view of a portion of the finger biometric sensor of the electronic device of FIG. 1.

Referring additionally to FIG. 4, the finger biometric sensor 30 includes a finger biometric sensing layer 33. The finger biometric sensing layer 33 includes an array of transparent conductive finger biometric sensing pixels 34 capacitively coupled to the transparent conductive layer 42 of the touch display 23. The array of transparent conductive finger biometric sensing pixels 34 may be electric field biometric sensing pixels. The array of transparent conductive finger biometric sensing pixels 34 may also comprise ITO. Of course, the array of transparent conductive finger biometric sensing pixels 34 may be another material.

The finger biometric sensor 30 also includes switchable transparent conductive blocking areas 32 between the finger biometric sensing layer 33 and the transparent conductive layer 42 of the touch display 23. The switchable transparent conductive blocking areas 32 may include ITO, for example. Of course the switchable transparent conductive blocking areas 32 may include other and/or additional materials. The switchable transparent conductive blocking areas 32 are switchable between blocking and reading states, as will be explained in further detail below. Illustratively, the switchable transparent conductive blocking areas 32a-32d are in the form of spaced apart rectangular patches extending in a first direction of the array of transparent conductive finger biometric sensing pixels 34 (FIG. 4). The finger biometric sensing layer 33 and more particularly includes spaced apart rectangular patches or columns extending in a second direction opposite the switchable transparent conductive blocking areas 32 that define the array of transparent conductive finger biometric sensing pixels 34.

Reading circuitry 50 is also coupled to the finger biometric sensor 30. The reading circuitry 50 includes amplifiers 51, for example, a respective amplifier for each column of the array of transparent conductive finger biometric sensing pixels 34, coupled to the array of transparent conductive finger biometric sensing pixels. Each amplifier 51 may be a single-ended amplifier, for example. Of course, there may be any number of amplifiers 51, including a single amplifier, as will be appreciated by those skilled in the art. The reading circuitry 50 also includes a respective switch 52a-52d coupled to each spaced apart rectangular patch of the switchable transparent conductive blocking areas 32a-32d.

The reading circuitry 50 also includes a controller 53 coupled to the amplifiers 52 and the switches 52a-52d. The controller 53 is configured to read consecutive rows of the array of transparent conductive finger biometric sensing pixels 34 and switch the switchable transparent conductive blocking areas 32a-32d beneath a row to be read to the reading state (e.g. 32*b*) while switching other switchable transparent conductive blocking areas to the blocking state (e.g. 32*a*, 32*c*, 32*d*).

For example, when a row is to be read or imaged, the switch 52*b* coupled to the switchable transparent conductive blocking areas 32*b*, or rectangular patch, below the row is switched, for example, opened, so those areas are electrically floated. The touch sensing pixels of the transparent conductive layer 42 drive the row, for example, uniformly. The other switches 52*a*, 52*c*, 52*d* corresponding to areas 32*a*, 32*c*, 32*d* or rectangular patches that are not beneath the row to be read are switched, for example, closed, so that those areas are coupled to a reference voltage, for example a circuit ground. Those switchable transparent conductive blocking areas 32*a*, 32*c*, 32*d* may effectively block the drive signal. It should be noted that shielding at a far edge (e.g., relative to the reading circuitry 50) may not be as effective as desired as on a near edge due to the grounded switchable transparent conductive blocking areas 32*a*-32*d* linear resistance, as will be appreciated by those skilled in the art.

The finger biometric sensor 30 also includes a transparent dielectric layer 37 between the switchable transparent conductive blocking areas 32 and the finger biometric sensing layer 33. The transparent dielectric layer 37 serves as a dielectric buffer so that the switchable transparent conductive blocking areas 32 and the array of transparent conductive finger biometric sensing pixels 34 do not short circuit.

A transparent dielectric cover layer 46 is over the finger biometric sensor 30 (FIG. 3). The transparent dielectric cover layer 46 may be glass, for example, or may another transparent dielectric material.

Figure 5:
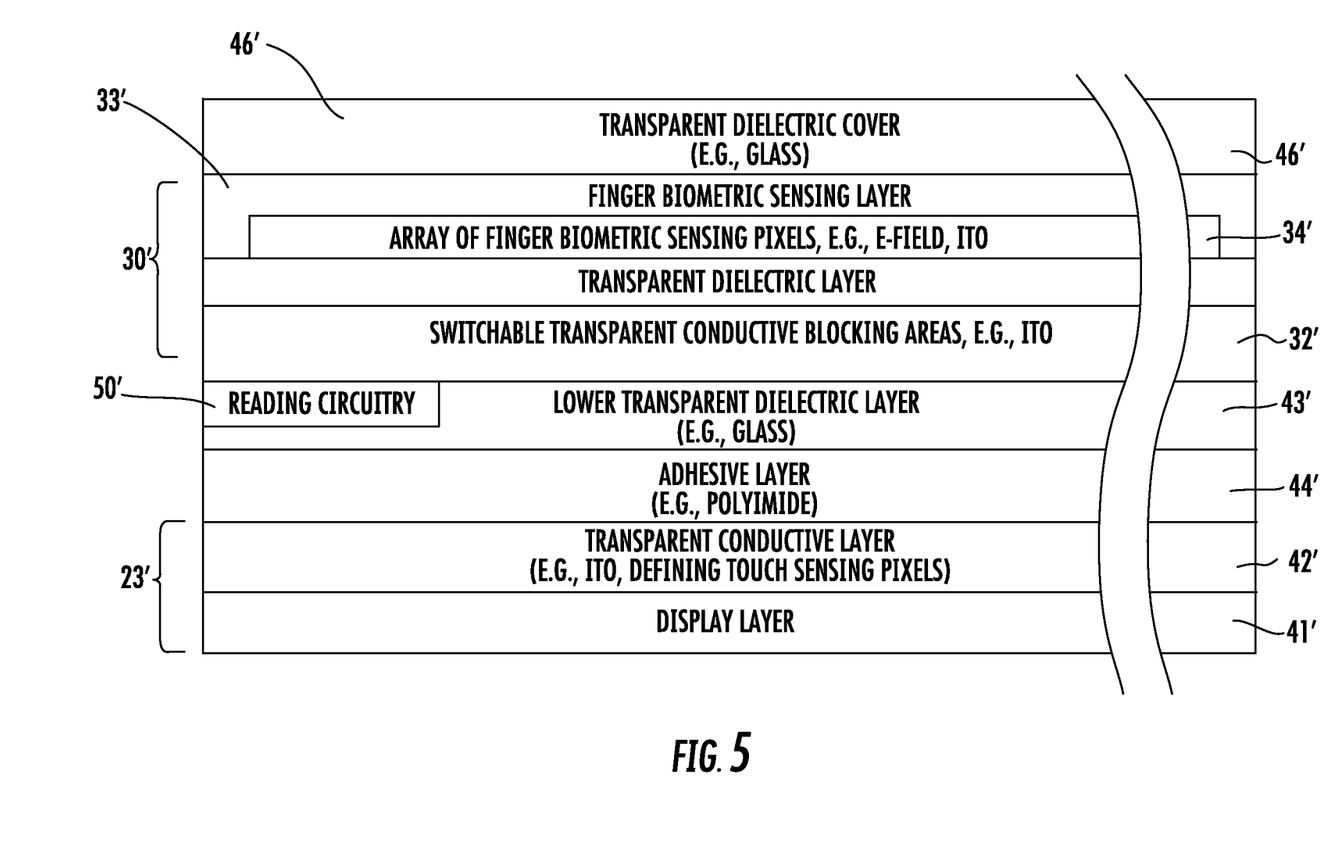
FIG. 5 is a detailed schematic diagram of an electronic device according to another embodiment.

Referring now to FIG. 5, in another embodiment, the finger biometric sensor 30' extends over an entire upper surface of the touch display 23'. In other words, there is not an adhesive layer laterally adjacent the finger biometric sensor 30'.

Figure 6:
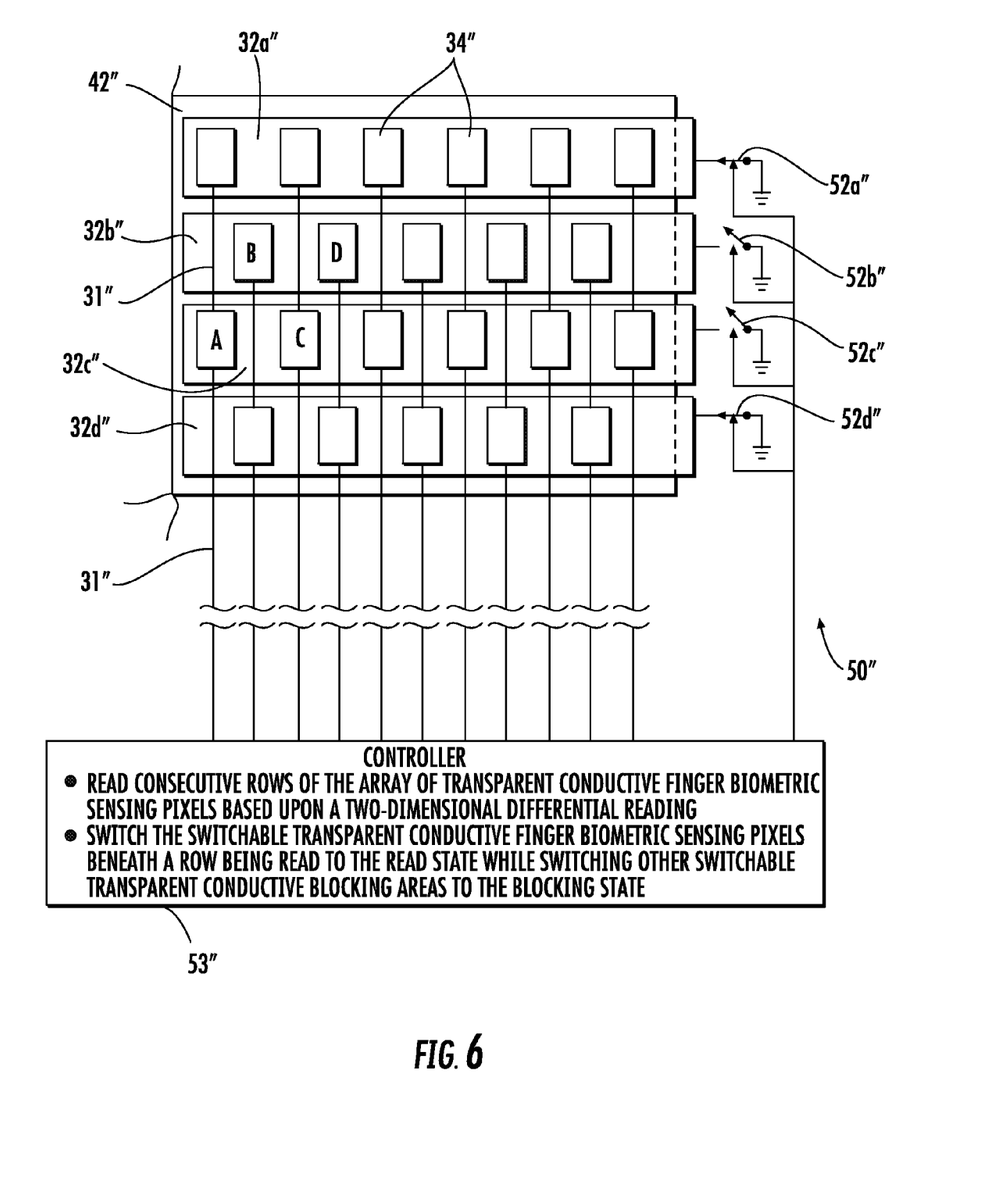
FIG. 6 is a schematic top view of the finger biometric sensor of an electronic device according to another embodiment.

Referring to FIG. 6, in another embodiment, the controller 53" is configured for two-dimensional differential reading of the array of transparent conductive finger biometric sensing pixels 23". In this embodiment, both horizontal and vertical difference measurements or readings are performed. In particular, for a horizontal difference, transparent conductive blocking areas 32*b*" below a desired row, for example a single rectangular patch, is switched so that it is electrically floating. Local horizontal differences between the adjacent pixels B-D of the array of transparent conductive finger biometric sensing pixels are measured. To measure vertical differences, transparent conductive blocking areas 32*b*", 32*c*", for example, two adjacent spaced apart rectangular patches, are switched so that they are electrically floating. The local vertical differences between adjacent pixels A-B, C-D, of the array of transparent conductive finger biometric sensing pixels 34" are measured. The vertical differences may be measured at an angle other than vertical. The angle can be accounted for in an integration process that converts the difference measurements, for example representing an image, back to a normal image, as will be appreciated by those skilled in the art.

However, it should be noted that one disadvantage of this configuration relative to the single-ended array embodiment described above with respect to FIGS. 3-4, for example, may be that higher linear resistance is generally in the sense lines. To adjust resistivity and coupling, for example, relatively thin or narrow transparent conductive traces 31", for example ITO, that are part of an interconnect layer of the finger biometric sensor 30" may be used and extend from each pixel of the array of transparent conductive finger biometric sensing pixels 34" to sensing circuitry or other circuitry.

With respect to the relatively narrow transparent conductive traces 31", it may be desirable, from a signal perspective, that the relatively narrow width be less than 5% of the width of each pixel of the array of transparent conductive finger biometric sensing pixels 34". For example, assuming each pixel has a width of 25 microns, it may be particularly desirable that each corresponding transparent conductive trace 31" be 1 micron wide (4%). A frequency response of the array of transparent conductive finger biometric sensing pixels 34" and the transparent conductive traces 31" is generally not that different from that of the embodiment described above with respect to FIGS. 3-4. Additionally, the linear resistance of the relatively narrow transparent conductive traces 31" may be about 25-times that of the relatively wide pixels. The parasitic capacitance of the transparent conductive traces 31" to adjacent transparent conductive traces may also be reduced by a similar ratio, as will be appreciated by those skilled in the art.

A method aspect is directed to a method of sensing a finger biometric using an electronic device 20 that includes a touch display 23 including at least one display layer 41, and at least one transparent conductive layer 42 thereon defining touch sensing pixels. A finger biometric sensor 30 is also carried by the touch display. The method includes selectively switching a plurality of switchable transparent conductive blocking areas 32 of the finger biometric sensor 30 between blocking and reading states. The plurality of switchable transparent conductive blocking areas 32 are between a finger biometric sensing layer 33 of the finger biometric sensor 30 and the at least one transparent conductive layer 42 of the touch display 23. The finger biometric sensing layer 30 includes an array of transparent conductive finger biometric sensing pixels 34 capacitively coupled to the at least one transparent conductive layer 42 of the touch display 23.

It should be appreciated that while a touch display 23 that includes a display layer 41 and at least one transparent conductive layer 42 thereon defining touch sensing pixels is described herein, the touch display may have initially been a display without touch capability. In this case, the transparent conductive layer 42 may have initially been considered a display electrode to drive the display, which, as in the illustrated electronic device 20, would become adapted to provide a relatively high resolution touch sensing function in addition to finger biometric sensing.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a touch display comprising at least one display layer, and at least one transparent conductive layer thereon defining touch sensing pixels; and
a finger biometric sensor carried by the touch display and comprising
a finger biometric sensing layer comprising an array of transparent conductive finger biometric sensing pixels capacitively coupled to the at least one transparent conductive layer of the touch display, and
a plurality of switchable transparent conductive blocking areas between the finger biometric sensing layer and the at least one transparent conductive layer of the touch display and being selectively switchable between blocking and reading states.

2. The electronic device of claim 1 further comprising reading circuitry coupled to the finger biometric sensor comprising:
at least one amplifier coupled to the array of transparent conductive finger biometric sensing pixels;
a plurality of switches, each switch associated with a respective one of the switchable transparent conductive blocking areas; and
a controller coupled to the at least one amplifier and the plurality of switches.

3. The electronic device of claim 2 wherein the controller is configured to read consecutive rows of the array of transparent conductive finger biometric sensing pixels, and switch the switchable transparent conductive blocking areas beneath a row being read to the reading state while switching other switchable transparent conductive blocking areas to the blocking state.

4. The electronic device of claim 2 wherein the controller is configured for two-dimensional differential reading of the array of transparent conductive finger biometric sensing pixels.

5. The electronic device of claim 1 wherein the blocking state comprises being coupled to a reference voltage, and the reading state comprises being electrically floating.

6. The electronic device of claim 1 wherein the plurality of switchable transparent conductive blocking areas comprises a plurality of spaced apart rectangular patches extending in a first direction of the array transparent conductive finger biometric sensing pixels.

7. The electronic device of claim 1 wherein the finger biometric sensor extends over an entire upper surface of the touch display.

8. The electronic device of claim 1 further comprising a lower transparent dielectric layer between the touch display and the finger biometric sensor.

9. The electronic device of claim 1 further comprising a transparent dielectric cover layer over the finger biometric sensor.

10. An electronic device comprising:
a touch display comprising at least one display layer, and at least one transparent conductive layer thereon defining touch sensing pixels;
a finger biometric sensor carried by and extending over an entire upper surface of the touch display, the finger biometric sensor comprising
a finger biometric sensing layer comprising an array of transparent conductive finger biometric sensing pixels capacitively coupled to the at least one transparent conductive layer of the touch display, and
a plurality of switchable transparent conductive blocking areas between the finger biometric sensing layer and the at least one transparent conductive layer of the touch display and being selectively switchable between blocking and reading states; and
reading circuitry coupled to the finger biometric sensor comprising
at least one amplifier coupled to the array of transparent conductive finger biometric sensing pixels,
a plurality of switches, each switch associated with a respective one of the switchable transparent conductive blocking areas, and
a controller coupled to the at least one amplifier and the plurality of switches.

11. The electronic device of claim 10 wherein the controller is configured to read consecutive rows of the array of transparent conductive finger biometric sensing pixels, and switch the switchable transparent conductive blocking areas beneath a row being read to the reading state while switching other switchable transparent conductive blocking areas to the blocking state.

12. The electronic device of claim 10 wherein the controller is configured for two-dimensional differential reading of the array of transparent conductive finger biometric sensing pixels.

13. The electronic device of claim 10 wherein the blocking state comprises being coupled to a reference voltage, and the reading state comprises being electrically floating.

14. The electronic device of claim 10 wherein the plurality of switchable transparent conductive blocking areas comprises a plurality of spaced apart rectangular patches extending in a first direction of the array transparent conductive finger biometric sensing pixels.

15. The electronic device of claim 10 further comprising a lower transparent dielectric layer between the touch display and the finger biometric sensor.

16. The electronic device of claim 10 further comprising a transparent dielectric cover layer over the finger biometric sensor.

17. A method of sensing a finger biometric using an electronic device comprising a touch display comprising at least one display layer and at least one transparent conductive layer thereon defining touch sensing pixels, and a finger biometric sensor carried by the touch display, the method comprising:
  selectively switching a plurality of switchable transparent conductive blocking areas of the finger biometric sensor between blocking and reading states, the plurality of switchable transparent conductive blocking areas between a finger biometric sensing layer of the finger biometric sensor and the at least one transparent conductive layer of the touch display, and the finger biometric sensing layer comprising an array of transparent conductive finger biometric sensing pixels capacitively coupled to the at least one transparent conductive layer of the touch display.

18. The method of claim 17 wherein selectively switching a plurality of switchable transparent conductive blocking areas comprises using a controller coupled to at least one amplifier and a plurality of switches, the at least one amplifier being coupled to the array of transparent conductive finger biometric sensing pixels, each switch of the plurality of switches being associated with a respective one of the switchable transparent conductive blocking areas.

19. The method of claim 18 wherein the controller is used to read consecutive rows of the array of transparent conductive finger biometric sensing pixels, and switch the switchable transparent conductive blocking areas beneath a row being read to the reading state while switching other switchable transparent conductive blocking areas to the blocking state.

20. The method of claim 18 wherein the controller is used for two-dimensional differential reading of the array of transparent conductive finger biometric sensing pixels.

21. The method of claim 17 wherein the blocking state comprises being coupled to a reference voltage, and the reading state comprises being electrically floating.

22. The method of claim 17 wherein the plurality of switchable transparent conductive blocking areas comprises a plurality of spaced apart rectangular patches extending in a first direction of the array transparent conductive finger biometric sensing pixels.

* * * * *

UNITED STATES PATENT AND TRADEMARK OFFICE
CERTIFICATE OF CORRECTION

PATENT NO. : 9,652,066 B2  
APPLICATION NO. : 14/606502  
DATED : May 16, 2017  
INVENTOR(S) : Dale R. Setlak Page 1 of 1

It is certified that error appears in the above-identified patent and that said Letters Patent is hereby corrected as shown below:

In the Claims

Column 8, Line 14  Delete: "array transparent"  
Insert: --array of transparent--

Column 9, Line 1  Delete: "array transparent"  
Insert: --array of transparent--

Column 10, Line 24  Delete: "array transparent"  
Insert: --array of transparent--

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*